United States Patent
Kurian

(10) Patent No.: US 10,698,752 B2
(45) Date of Patent: Jun. 30, 2020

(54) PREVENTING UNAUTHORIZED ACCESS TO SECURE ENTERPRISE INFORMATION SYSTEMS USING A MULTI-INTERCEPT SYSTEM

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 450 days.

(21) Appl. No.: 15/794,271

(22) Filed: Oct. 26, 2017

(65) Prior Publication Data

US 2019/0129784 A1   May 2, 2019

(51) Int. Cl.
| | | |
|---|---|---|
| G06F 21/00 | (2013.01) | |
| G06F 11/07 | (2006.01) | |
| G06F 21/60 | (2013.01) | |
| G06F 11/30 | (2006.01) | |
| G06F 21/62 | (2013.01) | |
| G06F 21/53 | (2013.01) | |
| G06F 21/64 | (2013.01) | |

(52) U.S. Cl.
CPC ...... *G06F 11/0712* (2013.01); *G06F 11/3037* (2013.01); *G06F 11/3089* (2013.01); *G06F 21/53* (2013.01); *G06F 21/60* (2013.01); *G06F 21/6218* (2013.01); *G06F 21/64* (2013.01)

(58) Field of Classification Search
CPC ............. G06F 11/0712; G06F 11/3037; G06F 11/3089; G06F 21/60; G06F 21/64; G06F 21/53; G06F 21/6218
See application file for complete search history.

(56) References Cited

U.S. PATENT DOCUMENTS

| | | |
|---|---|---|
| 7,185,107 B1 | 2/2007 | Cassar |
| 7,356,596 B2 | 4/2008 | Ramanujan et al. |
| 7,360,245 B1 | 4/2008 | Ramachandran et al. |
| 7,525,921 B1 | 4/2009 | Yi Dar Lo |
| 7,565,426 B2 | 7/2009 | Jones et al. |
| 7,706,278 B2 | 4/2010 | Wing et al. |
| 7,852,772 B2 | 12/2010 | Filsfils et al. |

(Continued)

*Primary Examiner* — John B King
(74) *Attorney, Agent, or Firm* — Banner & Witcoff, Ltd.; Michael A. Springs

(57) ABSTRACT

Aspects of the disclosure relate to preventing unauthorized access to secure enterprise information systems using a multi-intercept system. A computing platform may monitor, in a passive operational state, first communications across a plurality of computer systems in a protected zone of a computing environment using a plurality of communication monitoring nodes deployed in the protected zone of the computing environment. Subsequently, the computing platform may generate current data movement pattern data. If the computing platform determines that the current data movement pattern data is invalid, the computing platform may switch from the passive operational state to an active operational state and may generate and send an active intercept response command. The active intercept response command may redirect one or more requests from a malicious system into a virtual tunnel configured to route second communications from the malicious system out of the protected zone of the computing environment.

20 Claims, 10 Drawing Sheets

(56) References Cited

U.S. PATENT DOCUMENTS

| | | | |
|---|---|---|---|
| 7,855,953 B2 | 12/2010 | Filsfils et al. | |
| 7,864,669 B2 | 1/2011 | Bonaventure et al. | |
| 7,889,655 B2 | 2/2011 | Retana et al. | |
| 7,898,966 B1 | 3/2011 | Yi Dar Lo | |
| 8,234,707 B2 | 7/2012 | Stone et al. | |
| 8,281,400 B1 | 10/2012 | Eater et al. | |
| 8,856,869 B1* | 10/2014 | Brinskelle | G06F 21/31 726/2 |
| 8,925,095 B2* | 12/2014 | Herz | H04L 63/1441 713/188 |
| 8,955,130 B1* | 2/2015 | Kalintsev | G06F 21/567 701/415 |
| 9,160,654 B2 | 10/2015 | Dispensa et al. | |
| 9,497,113 B2 | 11/2016 | Dispensa et al. | |
| 9,894,088 B2* | 2/2018 | Ward | H04L 63/1425 |
| 10,037,689 B2* | 7/2018 | Taylor | G08G 1/096775 |
| 2008/0297313 A1* | 12/2008 | Kinkenzeller | G06F 21/577 340/10.1 |
| 2009/0241190 A1* | 9/2009 | Todd | G06F 21/53 726/23 |
| 2014/0068763 A1* | 3/2014 | Ward | H04L 63/1425 726/22 |
| 2014/0068775 A1* | 3/2014 | Ward | H04L 63/1441 726/24 |
| 2016/0021121 A1* | 1/2016 | Cui | H04L 63/145 726/1 |
| 2016/0292050 A1* | 10/2016 | Doshi | G06F 11/1471 |
| 2017/0201540 A1 | 7/2017 | Call et al. | |
| 2017/0206357 A1 | 7/2017 | Gorelik et al. | |
| 2017/0213165 A1 | 7/2017 | Stauffer et al. | |
| 2017/0214665 A1 | 7/2017 | Marlow et al. | |
| 2017/0214702 A1 | 7/2017 | Moscovici et al. | |
| 2017/0214705 A1 | 7/2017 | Gupta | |
| 2017/0223032 A1 | 8/2017 | El-Moussa et al. | |
| 2017/0223043 A1 | 8/2017 | Munoz et al. | |
| 2017/0228525 A1 | 8/2017 | Wajs et al. | |
| 2017/0230179 A1 | 8/2017 | Mannan et al. | |
| 2017/0230402 A1 | 8/2017 | Greenspan et al. | |
| 2017/0230509 A1 | 8/2017 | Lablans | |
| 2017/0236101 A1 | 8/2017 | Irudayam et al. | |
| 2017/0237767 A1 | 8/2017 | George et al. | |
| 2017/0238152 A1 | 8/2017 | Patel et al. | |
| 2017/0243004 A1 | 8/2017 | Kinder et al. | |
| 2017/0243005 A1 | 8/2017 | Kinder et al. | |
| 2017/0243009 A1 | 8/2017 | Sejpal et al. | |
| 2017/0244593 A1 | 8/2017 | Rangasamy et al. | |
| 2017/0244729 A1 | 8/2017 | Fahrny et al. | |
| 2017/0244734 A1 | 8/2017 | Kinder et al. | |
| 2017/0244750 A1 | 8/2017 | Kinder et al. | |
| 2017/0244754 A1 | 8/2017 | Kinder et al. | |
| 2017/0244762 A1 | 8/2017 | Kinder et al. | |
| 2017/0247000 A1 | 8/2017 | Ricci | |
| 2017/0250796 A1 | 8/2017 | Samid | |
| 2017/0251011 A1 | 8/2017 | Lapidous | |
| 2017/0251347 A1 | 8/2017 | Mehta et al. | |
| 2017/0257385 A1 | 9/2017 | Overson et al. | |
| 2017/0257399 A1 | 9/2017 | Mooring et al. | |
| 2017/0257474 A1 | 9/2017 | Rhoads et al. | |
| 2017/0259811 A1 | 9/2017 | Coulter et al. | |
| 2017/0264431 A1 | 9/2017 | Mattsson | |
| 2017/0264513 A1 | 9/2017 | Pietrowicz et al. | |
| 2017/0270296 A1 | 9/2017 | Kraemer | |
| 2017/0272182 A1 | 9/2017 | Sen et al. | |
| 2017/0272316 A1 | 9/2017 | Johnson et al. | |
| 2017/0272455 A1 | 9/2017 | Black et al. | |
| 2017/0277151 A1* | 9/2017 | Liu | G06F 11/3013 |
| 2017/0284816 A1 | 10/2017 | Greenspan et al. | |
| 2017/0284817 A1 | 10/2017 | Greenspan et al. | |
| 2017/0286172 A1 | 10/2017 | Saxena et al. | |
| 2017/0286673 A1 | 10/2017 | Lukacs et al. | |
| 2017/0288965 A1 | 10/2017 | Cebere | |
| 2017/0289341 A1 | 10/2017 | Rodriguez et al. | |
| 2017/0293758 A1 | 10/2017 | Saxena et al. | |
| 2017/0293906 A1 | 10/2017 | Komarov | |
| 2017/0295014 A1 | 10/2017 | Baras et al. | |
| 2017/0299633 A1 | 10/2017 | Pietrowicz et al. | |
| 2017/0301220 A1 | 10/2017 | Jarrell et al. | |
| 2017/0302634 A1 | 10/2017 | Miller et al. | |
| 2019/0230120 A1* | 7/2019 | Chen | H04L 9/0897 |
| 2020/0014705 A1* | 1/2020 | Cui | G06F 21/54 |

* cited by examiner

PREVENTING UNAUTHORIZED ACCESS TO SECURE ENTERPRISE INFORMATION SYSTEMS USING A MULTI-INTERCEPT SYSTEM

BACKGROUND

Aspects of the disclosure relate to digital data processing systems, information security, and preventing unauthorized access to secure information systems. In particular, one or more aspects of the disclosure relate to preventing unauthorized access to secure enterprise information systems using a multi-intercept system.

Enterprise organizations may utilize various computing infrastructure to maintain large data sets, which may include confidential information and/or other sensitive data that is created and/or used for various purposes. In some instances, these large data sets may need to be accessed by and/or transferred across various networks and/or between various computer systems. Ensuring security when accessing and/or transferring such data may be critically important to protect the integrity and confidentiality of the underlying information. In many instances, however, it may be difficult to ensure the integrity and confidentiality of the information associated with the data sets while also attempting to optimize the resource utilization, bandwidth utilization, and efficient operations of the computing infrastructure involved in maintaining, accessing, and transferring the data.

SUMMARY

Aspects of the disclosure provide effective, efficient, scalable, and convenient technical solutions that address and overcome the technical problems associated with ensuring information security and preventing unauthorized access to resources of enterprise computer systems. In particular, one or more aspects of the disclosure relate to preventing unauthorized access to secure enterprise information systems using a multi-intercept system.

In accordance with one or more embodiments, a computing platform having at least one processor, a memory, and a communication interface may monitor, in a passive operational state, first communications across a plurality of computer systems in a protected zone of a computing environment using a plurality of communication monitoring nodes deployed in the protected zone of the computing environment. Subsequently, the computing platform may generate current data movement pattern data based on monitoring the first communications across the plurality of computer systems in the protected zone of the computing environment. Then, the computing platform may determine that the current data movement pattern data is invalid based on comparing the current data movement pattern data to baseline data movement pattern data for the protected zone of the computing environment. In response to determining that the current data movement pattern data is invalid based on comparing the current data movement pattern data to the baseline data movement pattern data, the computing platform may switch from the passive operational state to an active operational state. Based on switching from the passive operational state to the active operational state, the computing platform may generate an active intercept response command, and the active intercept response command may redirect one or more requests from a malicious system into a virtual tunnel configured to route second communications from the malicious system out of the protected zone of the computing environment. Then, the computing platform may send, via the communication interface, to the malicious system, the active intercept response command redirecting the one or more requests from the malicious system into the virtual tunnel configured to route the second communications from the malicious system out of the protected zone of the computing environment.

In some embodiments, monitoring the first communications across the plurality of computer systems in the protected zone of the computing environment using the plurality of communication monitoring nodes deployed in the protected zone of the computing environment may include receiving, from the plurality of communication monitoring nodes deployed in the protected zone of the computing environment, one or more data transmissions intercepted by the plurality of communication monitoring nodes deployed in the protected zone of the computing environment.

In some embodiments, monitoring the first communications across the plurality of computer systems in the protected zone of the computing environment using the plurality of communication monitoring nodes deployed in the protected zone of the computing environment may include intercepting at least one data transmission associated with a computer system that is not linked to a communication monitoring node of the plurality of communication monitoring nodes.

In some embodiments, determining that the current data movement pattern data is invalid based on comparing the current data movement pattern data to the baseline data movement pattern data for the protected zone of the computing environment may include loading the baseline data movement pattern data for the protected zone of the computing environment from an environment profile associated with the computing environment maintained by the computing platform.

In some embodiments, switching from the passive operational state to the active operational state may include sending a state change notification to a computing device linked to an administrative user of the computing platform, and sending the state change notification to the computing device linked to the administrative user of the computing platform may cause the computing device linked to the administrative user of the computing platform to display the state change notification.

In some embodiments, the virtual tunnel may be generated by the computing platform and may be configured to route the second communications from the malicious system out of the protected zone of the computing environment to a decoy data generator system.

In some embodiments, based on switching from the passive operational state to the active operational state, the computing platform may generate one or more virtualization commands directing a virtualization platform to generate a plurality of dummy virtual system of record instances. Then, the computing platform may send, via the communication interface, to the virtualization platform, the one or more virtualization commands directing the virtualization platform to generate the plurality of dummy virtual system of record instances.

In some embodiments, the virtual tunnel may be generated by the computing platform and may be configured to route the second communications from the malicious system out of the protected zone of the computing environment to at least one dummy virtual system of record instance of the plurality of dummy virtual system of record instances.

In some embodiments, prior to monitoring the first communications across the plurality of computer systems in the protected zone of the computing environment, the computing platform may scan the computing environment to identify the plurality of computer systems in the protected zone of the computing environment and to register the plurality of communication monitoring nodes deployed in the protected zone of the computing environment.

In some embodiments, after scanning the computing environment, the computing platform may monitor third communications across the plurality of computer systems in the protected zone of the computing environment using the plurality of communication monitoring nodes deployed in the protected zone of the computing environment. Subsequently, the computing platform may generate baseline data movement pattern data for the protected zone of the computing environment based on monitoring the third communications across the plurality of computer systems in the protected zone of the computing environment. Then, the computing platform may store the baseline data movement pattern data for the protected zone of the computing environment in an environment profile associated with the computing environment.

In some embodiments, after storing the baseline data movement pattern data for the protected zone of the computing environment in the environment profile associated with the computing environment, the computing platform may validate the baseline data movement pattern data for the protected zone of the computing environment stored in the environment profile associated with the computing environment.

In some embodiments, validating the baseline data movement pattern data for the protected zone of the computing environment stored in the environment profile associated with the computing environment may include sending a validation prompt to a computing device linked to an administrative user of the computing platform, and sending the validation prompt to the computing device linked to the administrative user of the computing platform may cause the computing device linked to the administrative user of the computing platform to display the validation prompt.

In some embodiments, the computing platform may monitor fourth communications across the plurality of computer systems in the protected zone of the computing environment using the plurality of communication monitoring nodes deployed in the protected zone of the computing environment. Subsequently, the computing platform may generate second current data movement pattern data for the protected zone of the computing environment based on monitoring the fourth communications across the plurality of computer systems in the protected zone of the computing environment. Then, the computing platform may determine that the second current data movement pattern data is valid based on comparing the second current data movement pattern data to the baseline data movement pattern data for the protected zone of the computing environment. In response to determining that the second current data movement pattern data is valid based on comparing the second current data movement pattern data to the baseline data movement pattern data, the computing platform may remain in the passive operational state.

In some embodiments, the computing platform may monitor fifth communications across the plurality of computer systems in the protected zone of the computing environment using the plurality of communication monitoring nodes deployed in the protected zone of the computing environment. Subsequently, the computing platform may generate third current data movement pattern data for the protected zone of the computing environment based on monitoring the fifth communications across the plurality of computer systems in the protected zone of the computing environment. Then, the computing platform may set an operational state based on the third current data movement pattern data for the protected zone of the computing environment.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
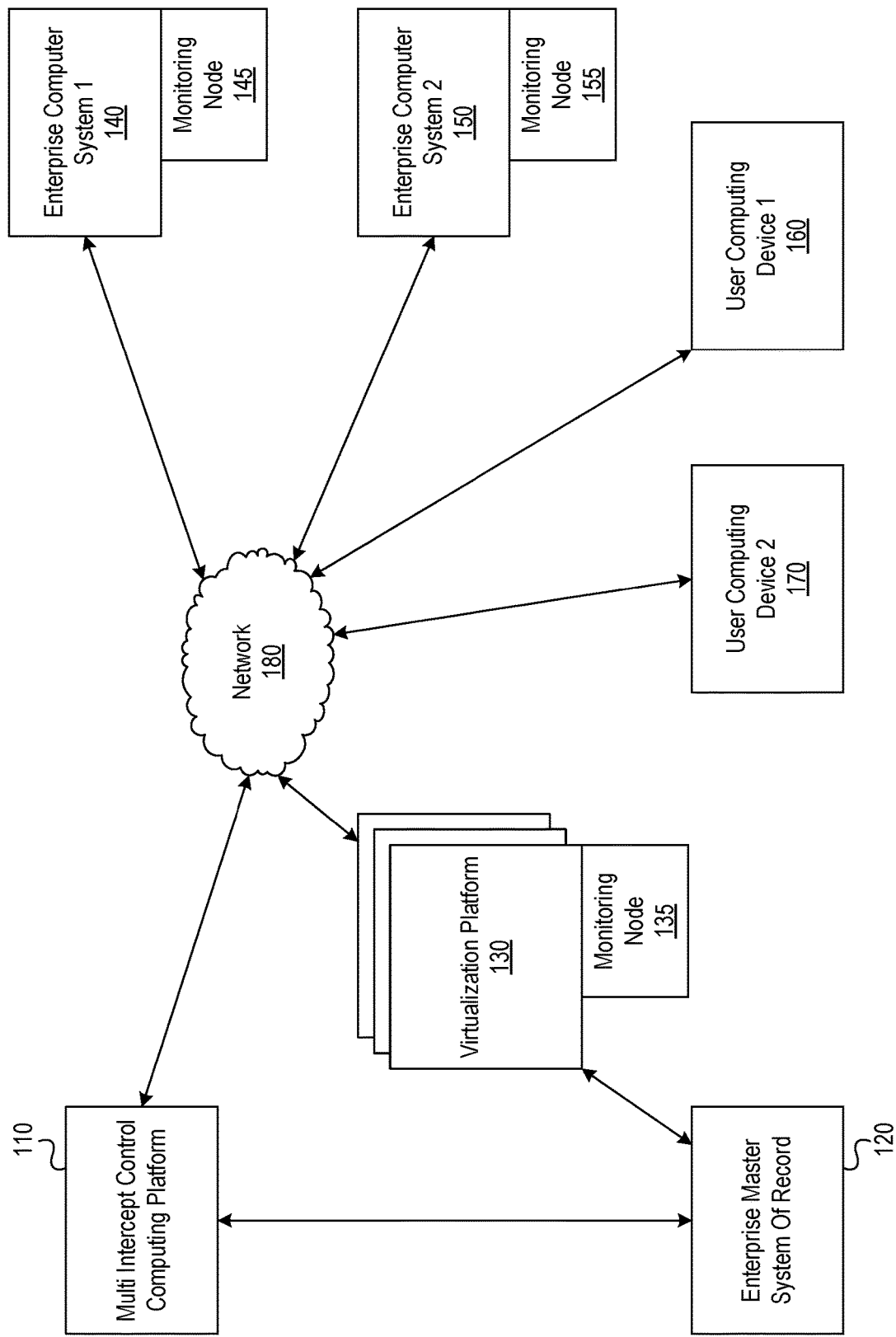
FIGS. 1A and 1B depict an illustrative computing environment for preventing unauthorized access to secure enterprise information systems using a multi-intercept system in accordance with one or more example embodiments.
Figure 1B:
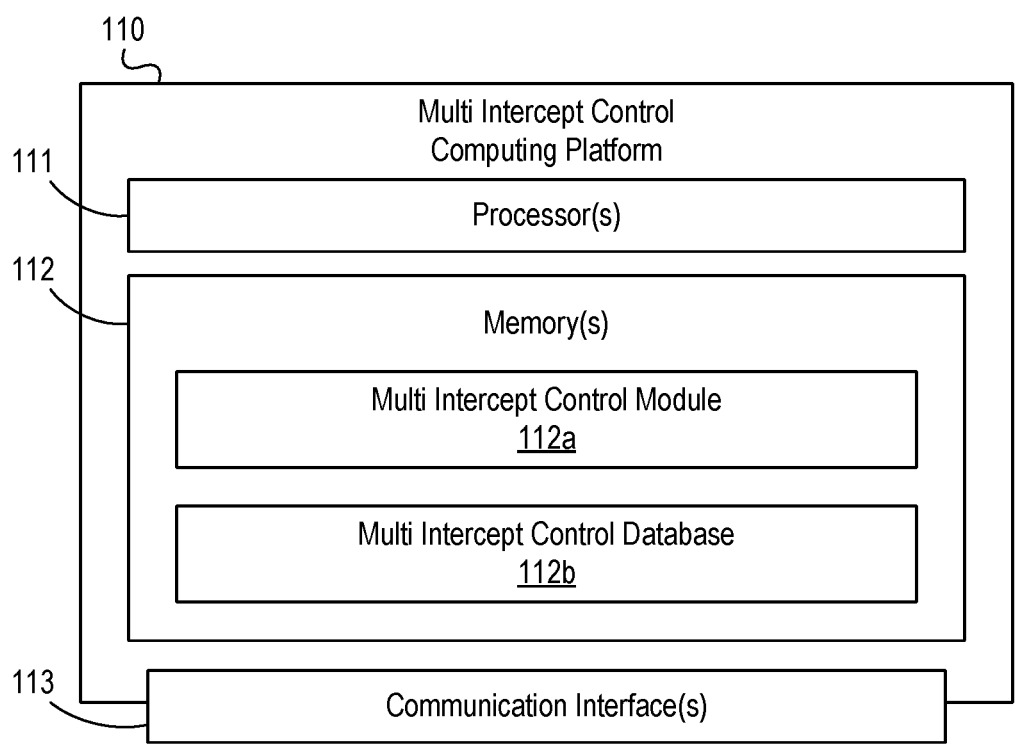

FIGS. 1A and 1B depict an illustrative computing environment for preventing unauthorized access to secure enterprise information systems using a multi-intercept system in accordance with one or more example embodiments. Referring to FIG. 1A, computing environment 100 may include various computer systems, which may be located in the same data center or in different data centers, and various other computing devices. For example, computing environment 100 may include a multi-intercept control computing platform 110, an enterprise master system of record 120, a virtualization platform 130, a monitoring node 135, a first enterprise computer system 140, a monitoring node 145, a second enterprise computer system 150, a monitoring node 155, a first user computing device 160, and a second user computing device 170. Each of the data centers associated with computing environment 100 may be distinct and physically separate from other data centers that are operated by and/or otherwise associated with an organization, such as a financial institution utilizing one or more computer systems included in computing environment 100. In addition, each data center associated with computing environment 100 may house a plurality of server computers and various other computers, network components, and devices.

Multi-intercept control computing platform 110 may include one or more computer systems (e.g., servers, server blades, and/or the like) and may be configured to perform and/or otherwise provide one or more functions described herein, as discussed in greater detail below. Enterprise master system of record 120 may include one or more computer systems (e.g., servers, server blades, and/or the like) and may be configured to store, maintain, and/or update data associated with an enterprise organization. In some instances, enterprise master system of record 120 may be and/or include an enterprise data storage platform associated with a specific organization, and may store and/or maintain enterprise data in various tables and databases associated with different operational divisions within organization. Additionally or alternatively, enterprise master system of record 120 may store and/or maintain libraries and/or applications that may be accessed and/or used in connection with backend, development, and/or production systems. For instance, enterprise master system of record 120 may store and/or maintain user account data, financial account data, account balance information, transaction history information, user profile information, and/or other information used by and/or otherwise associated with an enterprise organization, such as a financial institution.

Virtualization platform 130 may include one or more computer systems (e.g., servers, server blades, and/or the like) and may be configured to generate, host, and/or otherwise provide one or more virtual machines. In some instances, virtualization platform 130 may, for instance, generate one or more operational virtual machine instances that include and/or provide access to some or all of the enterprise data stored and/or otherwise maintained by enterprise master system of record 120. Additionally or alternatively, virtualization platform 130 may, for instance, generate one or more dummy virtual machine instances that prevent access to any and/or all of the enterprise data stored and/or otherwise maintained by enterprise master system of record 120. Such dummy virtual machine instances may, for instance, share other characteristics (e.g., system identifiers, operating system identifiers, and/or the like) with the operational virtual machine instances, so as to confuse an attacker or a malicious system used by an attacker, but might not store or provide access to any actual data, such as actual enterprise data. Rather, the one or more dummy virtual machine instances may be used as a defense mechanism to protect enterprise master system of record 120 and the actual enterprise data maintained by enterprise master system of record 120 by occupying, misdirecting, disconnecting, overloading, and/or otherwise defensively handling one or more malicious systems and/or requests received from such malicious systems.

Monitoring node 135 may be a computing device that is connected to virtualization platform 130 and/or otherwise associated with virtualization platform 130. In some instances, monitoring node 135 may be configured to filter and/or otherwise monitor communications between virtualization platform 130 and one or more other computer systems, such as various messages, requests, data transmissions, and/or other communications in to virtualization platform 130 and/or out of virtualization platform 130.

Enterprise computer system 140 may be a computing device (e.g., a laptop computing device, a desktop computing device, a mobile computing device, and/or the like) that may be used by a first user associated with an enterprise organization. In some instances, enterprise computer system 140 may be configured to provide one or more interfaces that allow the user of enterprise computer system 140 to initiate a data access request (e.g., to obtain, view, and/or modify enterprise information maintained by enterprise master system of record 120 and/or provided by virtualization platform 130). Monitoring node 145 may be a computing device that is connected to enterprise computer system 140 and/or otherwise associated with enterprise computer system 140. In some instances, monitoring node 145 may be configured to filter and/or otherwise monitor communications between enterprise computer system 140 and one or more other computer systems, such as various messages, requests, data transmissions, and/or other communications in to enterprise computer system 140 and/or out of enterprise computer system 140.

Enterprise computer system 150 may be a computing device (e.g., a laptop computing device, a desktop computing device, a mobile computing device, and/or the like) that may be used by a second user associated with an enterprise organization. In some instances, enterprise computer system 150 may be configured to provide one or more interfaces that allow the user of enterprise computer system 150 to initiate a data access request (e.g., to obtain, view, and/or modify enterprise information maintained by enterprise master system of record 120 and/or provided by virtualization platform 130). Monitoring node 155 may be a computing device that is connected to enterprise computer system 150 and/or otherwise associated with enterprise computer system 150. In some instances, monitoring node 155 may be configured to filter and/or otherwise monitor communications between enterprise computer system 150 and one or more other computer systems, such as various messages, requests, data transmissions, and/or other communications in to enterprise computer system 150 and/or out of enterprise computer system 150.

User computing device 160 may be a computing device (e.g., a laptop computing device, a desktop computing device, a mobile computing device, and/or the like) that may be used by a third user outside of a protected zone of computing environment 100. In some instances, the third user may be associated with the same enterprise organization as enterprise computer system 140 and/or enterprise computer system 150, while in other instances, the third user might not be associated with the same enterprise organization as enterprise computer system 140 and/or enterprise computer system 150. In addition, user computing device 170 may be a computing device (e.g., a laptop computing device, a desktop computing device, a mobile computing device, and/or the like) that may be used by a fourth user outside of a protected zone of computing environment 100. In some instances, the fourth user may be associated with the same enterprise organization as enterprise computer system 140 and/or enterprise computer system 150, while in other instances, the fourth user might not be associated with the same enterprise organization as enterprise computer system 140 and/or enterprise computer system 150. For instance, in some examples discussed below, user computing device 170 may be a malicious system used by an attacker outside of the protected zone of computing environment 100.

In one or more arrangements, enterprise master system of record 120, virtualization platform 130, monitoring node 135, enterprise computer system 140, monitoring node 145, enterprise computer system 150, monitoring node 155, user computing device 160, and user computing device 170 may be any type of computing device capable of receiving a user interface, receiving input via the user interface, and communicating the received input to one or more other computing devices. For example, enterprise master system of record 120, virtualization platform 130, monitoring node 135, enterprise computer system 140, monitoring node 145, enterprise computer system 150, monitoring node 155, user computing device 160, and user computing device 170 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of enterprise master system of record 120, virtualization platform 130, monitoring node 135, enterprise computer system 140, monitoring node 145, enterprise computer system 150, monitoring node 155, user computing device 160, and user computing device 170 may, in some instances, be special-purpose computing devices configured to perform specific functions.

Computing environment 100 also may include one or more computing platforms. For example, computing environment 100 may include multi-intercept control computing platform 110. As illustrated in greater detail below, multi-intercept control computing platform 110 may include one or more computing devices configured to perform one or more of the functions described herein. For example, multi-intercept control computing platform 110 may include one or more computers (e.g., laptop computers, desktop computers, servers, server blades, or the like). Computing environment 100 also may include one or more networks, which may interconnect one or more of multi-intercept control computing platform 110, enterprise master system of record 120, virtualization platform 130, monitoring node 135, enterprise computer system 140, monitoring node 145, enterprise computer system 150, monitoring node 155, user computing device 160, and user computing device 170. For example, computing environment 100 may include network 180, which may include one or more public networks, one or more private networks, and/or one or more sub-networks (e.g., local area networks (LANs), wide area networks (WANs), or the like) and which may interconnect one or more of multi-intercept control computing platform 110, enterprise master system of record 120, virtualization platform 130, monitoring node 135, enterprise computer system 140, monitoring node 145, enterprise computer system 150, monitoring node 155, user computing device 160, and user computing device 170.

Referring to FIG. 1B, multi-intercept control computing platform 110 may include one or more processors 111, memory 112, and communication interface 113. A data bus may interconnect processor 111, memory 112, and communication interface 113. Communication interface 113 may be a network interface configured to support communication between multi-intercept control computing platform 110 and one or more networks (e.g., network 180 or the like). Memory 112 may include one or more program modules having instructions that when executed by processor 111 cause multi-intercept control computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of multi-intercept control computing platform 110 and/or by different computing devices that may form and/or otherwise make up multi-intercept control computing platform 110. For example, memory 112 may have, store, and/or include a multi-intercept control module 112a and a multi-intercept control database 112b. Multi-intercept control module 112a may have instructions that direct and/or cause multi-intercept control computing platform 110 to monitor data movement patterns, switch between various operational states, execute intercept actions, and/or perform other functions, as discussed in greater detail below. Multi-intercept control database 112b may store information used by multi-intercept control module 112a and/or multi-intercept control computing platform 110 in monitoring data movement patterns, switching between various operational states, executing intercept actions, and/or performing other functions.

Figure 2A:
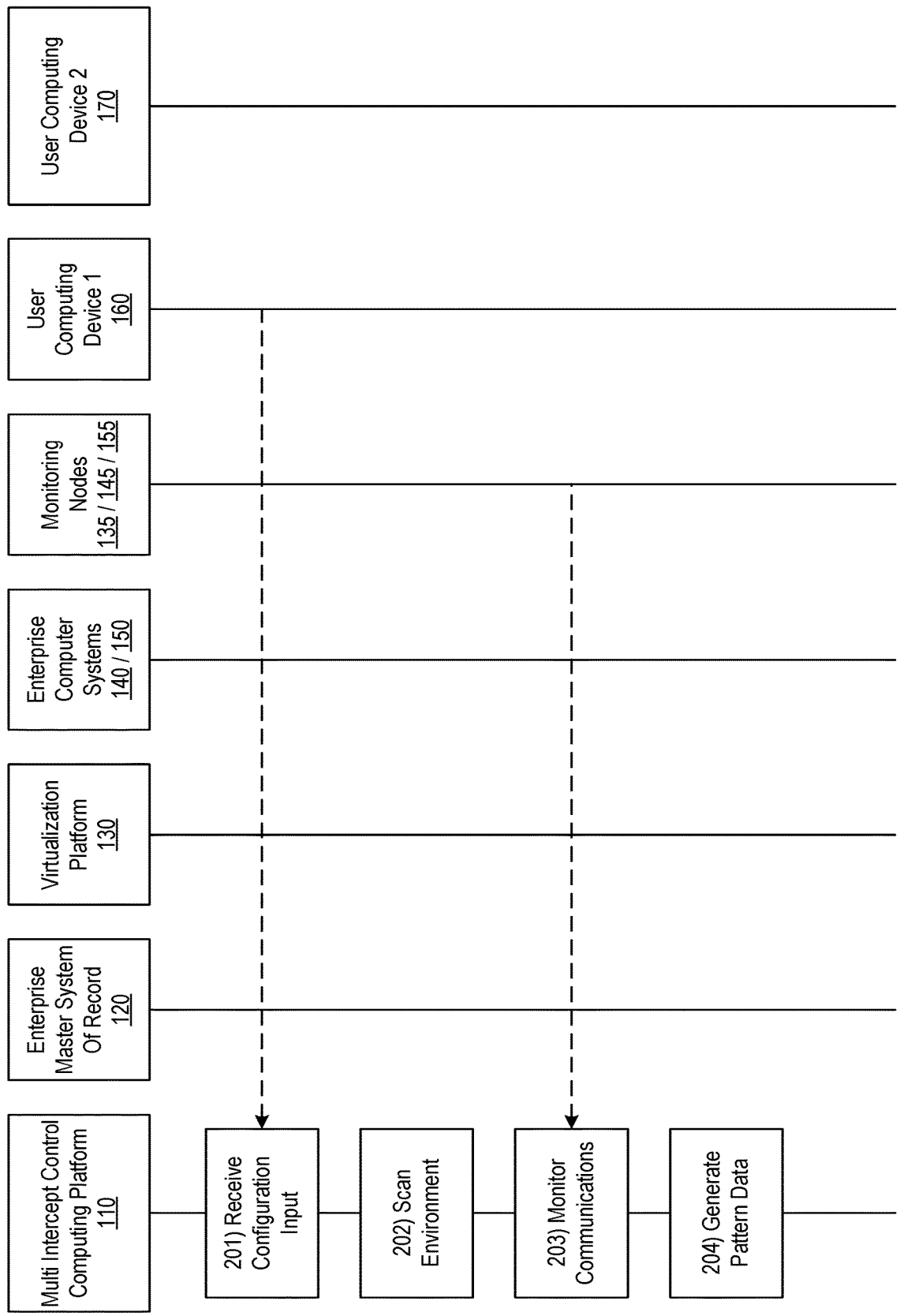
FIGS. 2A-2F depict an illustrative event sequence for preventing unauthorized access to secure enterprise information systems using a multi-intercept system in accordance with one or more example embodiments.

FIGS. 2A-2F depict an illustrative event sequence for preventing unauthorized access to secure enterprise information systems using a multi-intercept system in accordance with one or more example embodiments. Referring to FIG. 2A, at step 201, multi-intercept control computing platform 110 may receive configuration input (e.g., from an administrative user, via an administrative user device, such as user computing device 160) directing multi-intercept control computing platform 110 to initiate network monitoring and establish a baseline data movement pattern. At step 202, multi-intercept control computing platform 110 may scan a computing environment (e.g., computing environment 100) to identify one or more computer systems present in the computing environment, register one or more monitoring nodes present in the computing environment, and/or perform other functions. For example, at step 202, prior to monitoring communications across a plurality of computer systems in a protected zone of a computing environment, multi-intercept control computing platform 110 may scan the computing environment (e.g., computing environment 100) to identify a plurality of computer systems (e.g., enterprise master system of record 120, virtualization platform 130, enterprise computer system 140, enterprise computer system 150) in the protected zone of the computing environment and to register a plurality of communication monitoring nodes (e.g., monitoring node 135, monitoring node 145, monitoring node 155) deployed in the protected zone of the computing environment.

At step 203, multi-intercept control computing platform 110 may monitor communications (e.g., by receiving data from one or more monitoring nodes, intercepting communications between one or more computer systems, and/or the like). For example, at step 203, after scanning the computing environment (e.g., computing environment 100), multi-intercept control computing platform 110 may monitor third communications across the plurality of computer systems (e.g., enterprise master system of record 120, virtualization platform 130, enterprise computer system 140, enterprise computer system 150) in the protected zone of the computing environment using the plurality of communication monitoring nodes (e.g., monitoring node 135, monitoring node 145, monitoring node 155) deployed in the protected zone of the computing environment.

At step 204, multi-intercept control computing platform 110 may generate a baseline data movement pattern (e.g., by creating data identifying and/or defining normal data movement patterns in computing environment 100 based on the communications monitored by multi-intercept control computing platform 110). For example, at step 204, multi-intercept control computing platform 110 may generate baseline data movement pattern data for the protected zone of the computing environment (e.g., computing environment 100) based on monitoring the third communications across the plurality of computer systems (e.g., enterprise master system of record 120, virtualization platform 130, enterprise computer system 140, enterprise computer system 150) in the protected zone of the computing environment.

Figure 2B:
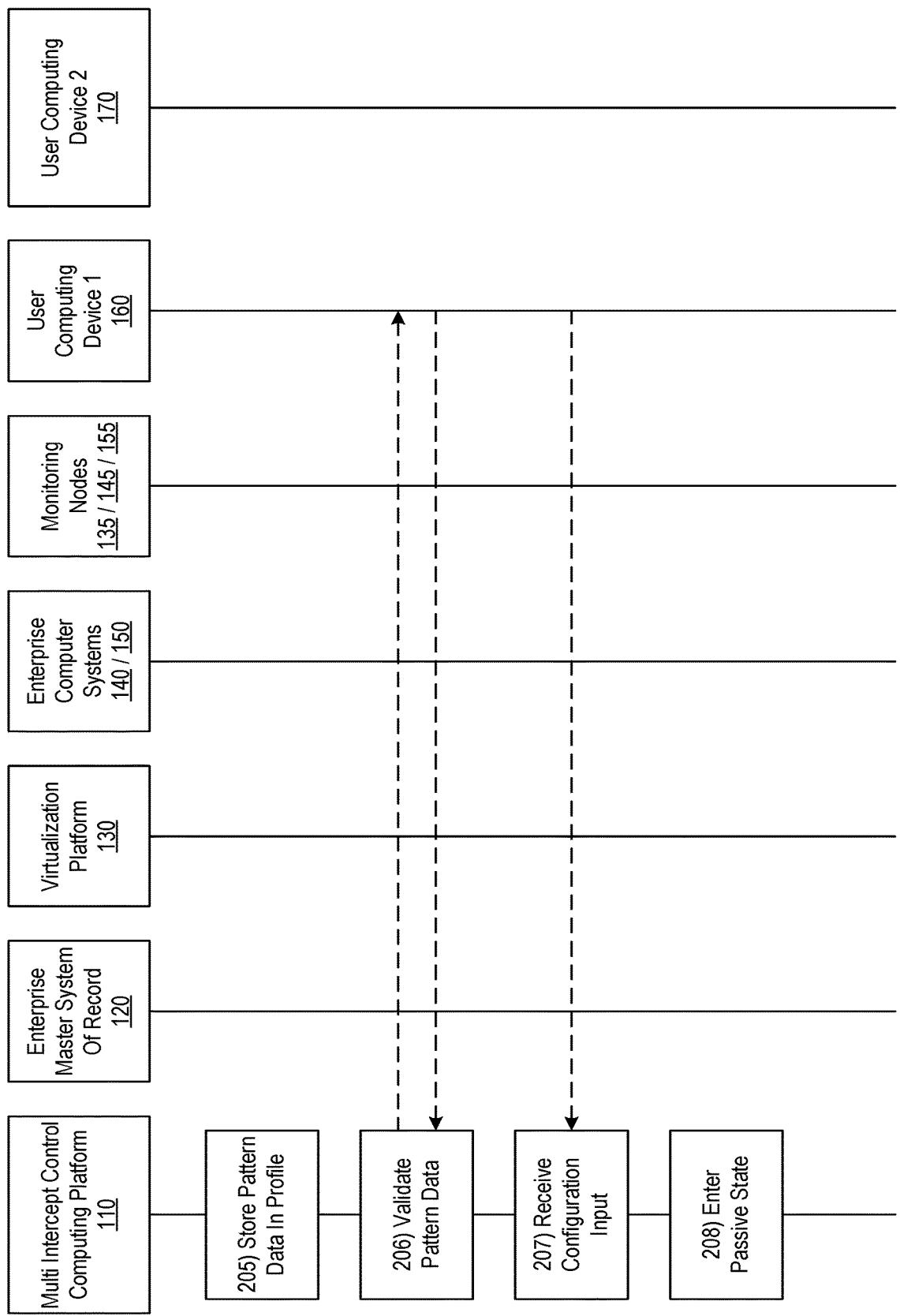

Referring to FIG. 2B, at step 205, multi-intercept control computing platform 110 may store the baseline data movement pattern in an environment profile (e.g., by generating and/or updating an environment profile for computing environment 100 maintained by multi-intercept control computing platform 110). For example, at step 205, multi-intercept control computing platform 110 may store the baseline data movement pattern data for the protected zone of the computing environment (e.g., computing environment 100) in an environment profile associated with the computing environment (e.g., computing environment 100).

At step 206, multi-intercept control computing platform 110 may validate the baseline data movement pattern. For example, at step 206, after storing the baseline data movement pattern data for the protected zone of the computing environment (e.g., computing environment 100) in the environment profile associated with the computing environment (e.g., computing environment 100), multi-intercept control computing platform 110 may validate the baseline data movement pattern data for the protected zone of the computing environment (e.g., computing environment 100) stored in the environment profile associated with the computing environment (e.g., computing environment 100).

Figure 3:
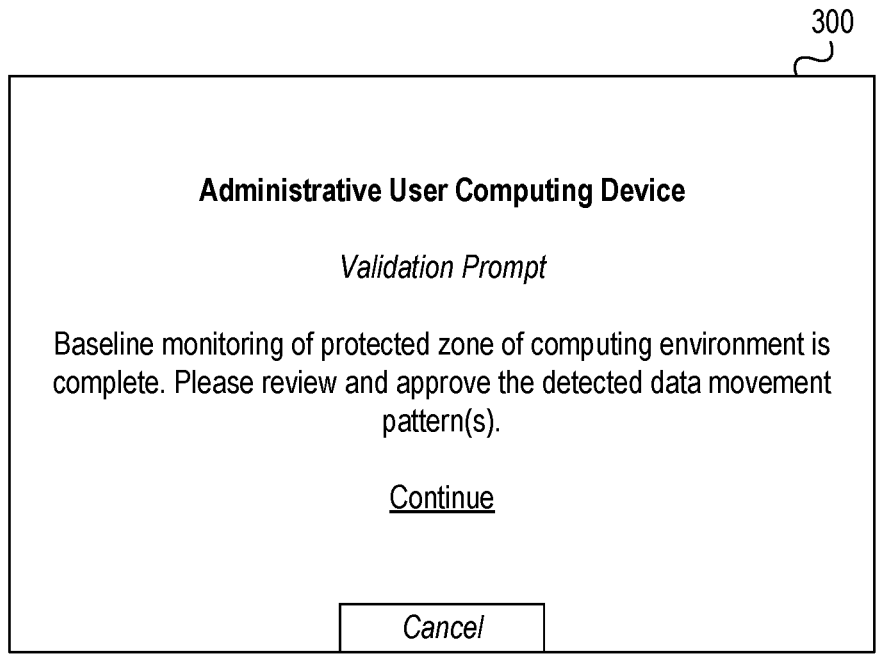
FIGS. 3 and 4 depict example graphical user interfaces for preventing unauthorized access to secure enterprise information systems using a multi-intercept system in accordance with one or more example embodiments.

In some embodiments, validating the baseline data movement pattern data for the protected zone of the computing environment stored in the environment profile associated with the computing environment may include sending a validation prompt to a computing device linked to an administrative user of the computing platform. In addition, sending the validation prompt to the computing device linked to the administrative user of the computing platform may cause the computing device linked to the administrative user of the computing platform to display the validation prompt. For example, in validating the baseline data movement pattern data for the protected zone of the computing environment (e.g., computing environment 100) stored in the environment profile associated with the computing environment (e.g., computing environment 100), multi-intercept control computing platform 110 may send a validation prompt to a computing device (e.g., user computing device 160) linked to an administrative user of the computing platform (e.g., user computing device 160). In addition, sending the validation prompt to the computing device (e.g., user computing device 160) linked to the administrative user of the computing platform (e.g., multi-intercept control computing platform 110) may cause the computing device (e.g., user computing device 160) linked to the administrative user of the computing platform (e.g., multi-intercept control computing platform 110) to display the validation prompt. For example, multi-intercept control computing platform 110 may cause user computing device 160 to display and/or otherwise present a graphical user interface similar to graphical user interface 300, which is illustrated in FIG. 3. As seen in FIG. 3, graphical user interface 300 may include text and/or other information notifying the user of user computing device 160 that baseline monitoring of the protected zone of computing environment 100 is complete and/or prompting the user of user computing device 160 to review and/or approve the baseline data movement pattern generated by multi-intercept control computing platform 110, so as to validate the baseline data movement pattern generated by multi-intercept control computing platform 110.

At step 207, multi-intercept control computing platform 110 may receive configuration input (e.g., from an administrative user, via an administrative user device, such as user computing device 160) directing multi-intercept control computing platform 110 to initiate and/or otherwise enter an operational mode. At step 208, multi-intercept control computing platform 110 may enter a passive operational state (e.g., in which multi-intercept control computing platform 110 may monitor communications but might not execute any active defensive measures, as discussed below).

Figure 2C:
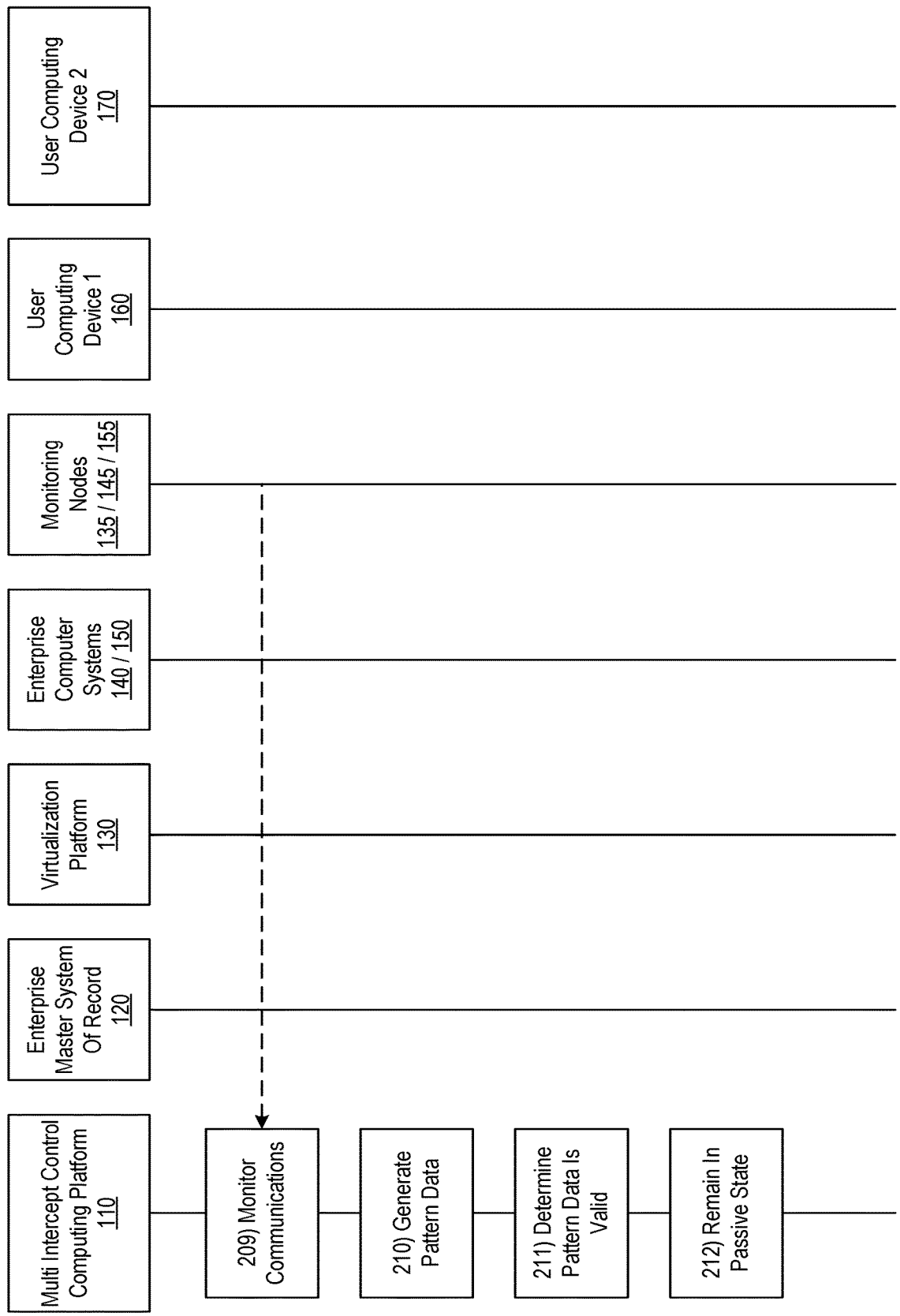

Referring to FIG. 2C, at step 209, multi-intercept control computing platform 110 may monitor communications (e.g., by receiving data from one or more monitoring nodes, intercepting communications between one or more computer systems, and/or the like). For example, at step 209, multi-intercept control computing platform 110 may monitor fourth communications across the plurality of computer systems (e.g., enterprise master system of record 120, virtualization platform 130, enterprise computer system 140, enterprise computer system 150) in the protected zone of the computing environment (e.g., computing environment 100) using the plurality of communication monitoring nodes (e.g., monitoring node 135, monitoring node 145, monitoring node 155) deployed in the protected zone of the computing environment (e.g., computing environment 100).

At step 210, multi-intercept control computing platform 110 may generate current data movement pattern data (e.g., by creating data identifying and/or defining current data movement patterns in computing environment 100 based on the communications monitored by multi-intercept control computing platform 110). For example, at step 210, multi-intercept control computing platform 110 may generate second current data movement pattern data for the protected zone of the computing environment (e.g., computing environment 100) based on monitoring the fourth communications across the plurality of computer systems (e.g., enterprise master system of record 120, virtualization platform 130, enterprise computer system 140, enterprise computer system 150) in the protected zone of the computing environment (e.g., computing environment 100).

At step 211, multi-intercept control computing platform 110 may determine that the current data movement pattern data is valid (e.g., by comparing the current data movement pattern data to the baseline data movement pattern data). For example, at step 211, multi-intercept control computing platform 110 may determine that the second current data movement pattern data is valid based on comparing the second current data movement pattern data to the baseline data movement pattern data for the protected zone of the computing environment (e.g., computing environment 100). Multi-intercept control computing platform 110 may make such a determination, for instance, based on being able to fit a first curve corresponding to the current data movement pattern data to a second curve corresponding to the baseline data movement pattern data, without modifying more than a threshold number of values or other data points in the current data movement pattern data.

At step 212, multi-intercept control computing platform 110 may remain in the passive operational state. For example, at step 212, in response to determining that the second current data movement pattern data is valid based on comparing the second current data movement pattern data to the baseline data movement pattern data, multi-intercept control computing platform 110 may remain in the passive operational state.

Figure 2D:
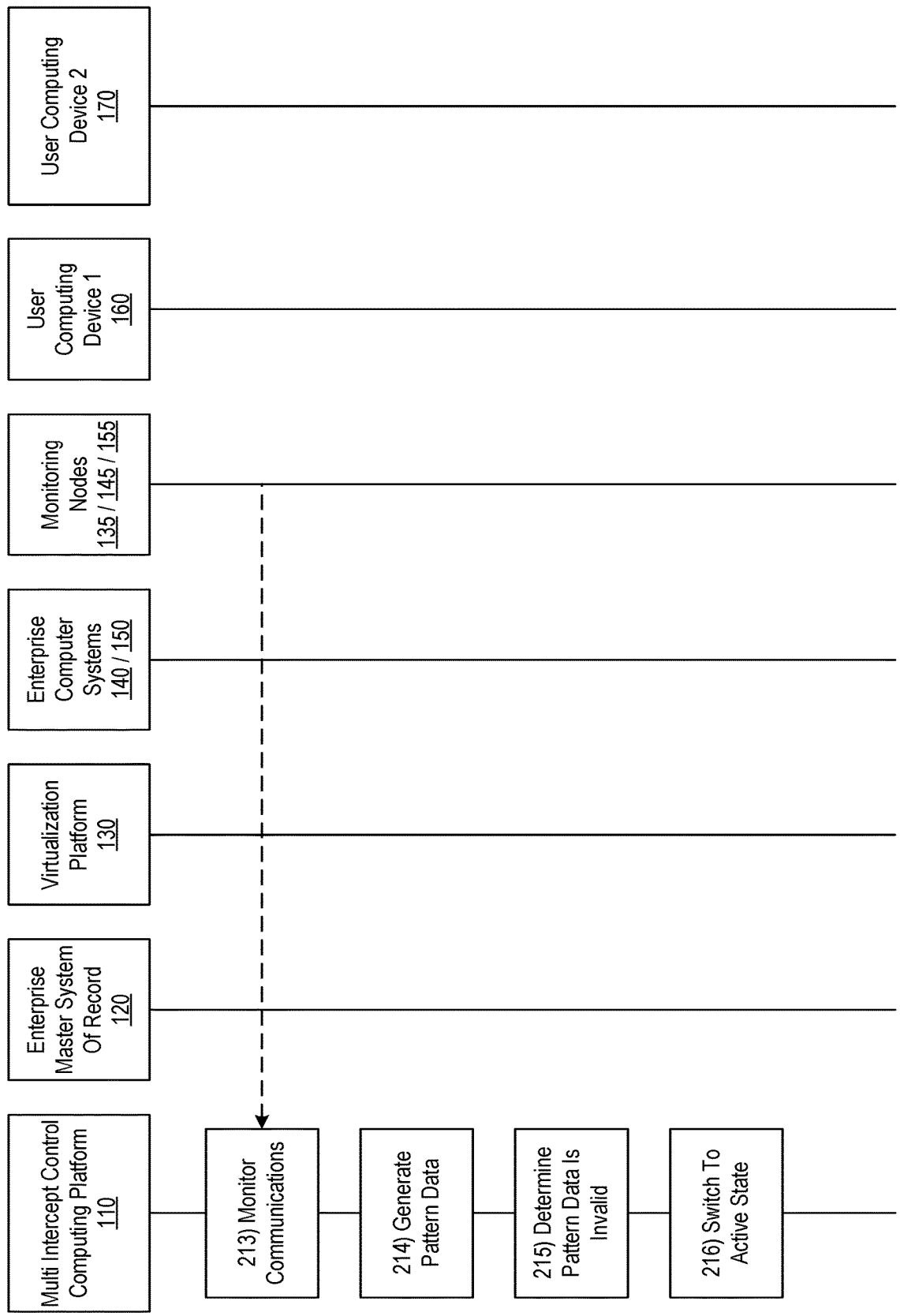

Referring to FIG. 2D, at step 213, may monitor communications (e.g., by receiving data from one or more monitoring nodes, intercepting communications between one or more computer systems, and/or the like). For example, at step 213, multi-intercept control computing platform 110 may monitor, in a passive operational state, first communications across a plurality of computer systems (e.g., enterprise master system of record 120, virtualization platform 130, enterprise computer system 140, enterprise computer system 150) in a protected zone of a computing environment (e.g., computing environment 100) using a plurality of communication monitoring nodes (e.g., monitoring node 135, monitoring node 145, monitoring node 155) deployed in the protected zone of the computing environment (e.g., computing environment 100).

In some embodiments, monitoring the first communications across the plurality of computer systems in the protected zone of the computing environment using the plurality of communication monitoring nodes deployed in the protected zone of the computing environment may include receiving, from the plurality of communication monitoring nodes deployed in the protected zone of the computing environment, one or more data transmissions intercepted by the plurality of communication monitoring nodes deployed in the protected zone of the computing environment. For example, in monitoring the first communications across the plurality of computer systems (e.g., enterprise master system of record 120, virtualization platform 130, enterprise computer system 140, enterprise computer system 150) in the protected zone of the computing environment (e.g., computing environment 100) using the plurality of communication monitoring nodes (e.g., monitoring node 135, monitoring node 145, monitoring node 155) deployed in the protected zone of the computing environment (e.g., computing environment 100), multi-intercept control computing platform 110 may receive, from the plurality of communication monitoring nodes (e.g., monitoring node 135, monitoring node 145, monitoring node 155) deployed in the protected zone of the computing environment (e.g., computing environment 100), one or more data transmissions intercepted by the plurality of communication monitoring nodes (e.g., monitoring node 135, monitoring node 145, monitoring node 155) deployed in the protected zone of the computing environment (e.g., computing environment 100).

In some embodiments, monitoring the first communications across the plurality of computer systems in the protected zone of the computing environment using the plurality of communication monitoring nodes deployed in the protected zone of the computing environment may include intercepting at least one data transmission associated with a computer system that is not linked to a communication monitoring node of the plurality of communication monitoring nodes. For example, in monitoring the first communications across the plurality of computer systems (e.g., enterprise master system of record 120, virtualization platform 130, enterprise computer system 140, enterprise computer system 150) in the protected zone of the computing environment (e.g., computing environment 100) using the plurality of communication monitoring nodes (e.g., monitoring node 135, monitoring node 145, monitoring node 155) deployed in the protected zone of the computing environment (e.g., computing environment 100), multi-intercept control computing platform 110 may intercept at least one data transmission associated with a computer system (e.g., user computing device 170) that is not linked to a communication monitoring node of the plurality of communication monitoring nodes (e.g., monitoring node 135, monitoring node 145, monitoring node 155).

At step 214, multi-intercept control computing platform 110 may generate current data movement pattern data (e.g., by creating data identifying and/or defining current data movement patterns in computing environment 100 based on the communications monitored by multi-intercept control computing platform 110). For example, at step 214, multi-intercept control computing platform 110 may generate current data movement pattern data based on monitoring the first communications across the plurality of computer systems (e.g., enterprise master system of record 120, virtualization platform 130, enterprise computer system 140, enterprise computer system 150) in the protected zone of the computing environment (e.g., computing environment 100).

At step 215, multi-intercept control computing platform 110 may determine that the current data movement pattern data is invalid (e.g., by comparing the current data movement pattern data to the baseline data movement pattern data). For example, at step 215, multi-intercept control computing platform 110 may determine that the current data movement pattern data is invalid based on comparing the current data movement pattern data to baseline data movement pattern data for the protected zone of the computing environment (e.g., computing environment 100). Multi-intercept control computing platform 110 may make such a determination, for instance, based on being able to fit a first curve corresponding to the current data movement pattern data to a second curve corresponding to the baseline data movement pattern data, without modifying more than a threshold number of values or other data points in the current data movement pattern data.

In some embodiments, determining that the current data movement pattern data is invalid based on comparing the current data movement pattern data to the baseline data movement pattern data for the protected zone of the computing environment may include loading the baseline data movement pattern data for the protected zone of the computing environment from an environment profile associated with the computing environment maintained by the computing platform. For example, in determining that the current data movement pattern data is invalid based on comparing the current data movement pattern data to the baseline data movement pattern data for the protected zone of the computing environment (e.g., computing environment 100), multi-intercept control computing platform 110 may load the baseline data movement pattern data for the protected zone of the computing environment (e.g., computing environment 100) from an environment profile associated with the computing environment (e.g., computing environment 100) maintained by the computing platform (e.g., multi-intercept control computing platform 110).

At step 216, multi-intercept control computing platform 110 may switch to an active state (e.g., in which multi-intercept control computing platform 110 may both monitor communications and execute one or more active defensive measures, as discussed below). For example, at step 216, in response to determining that the current data movement pattern data is invalid based on comparing the current data movement pattern data to the baseline data movement pattern data, multi-intercept control computing platform 110 may switch from the passive operational state to an active operational state.

Figure 4:
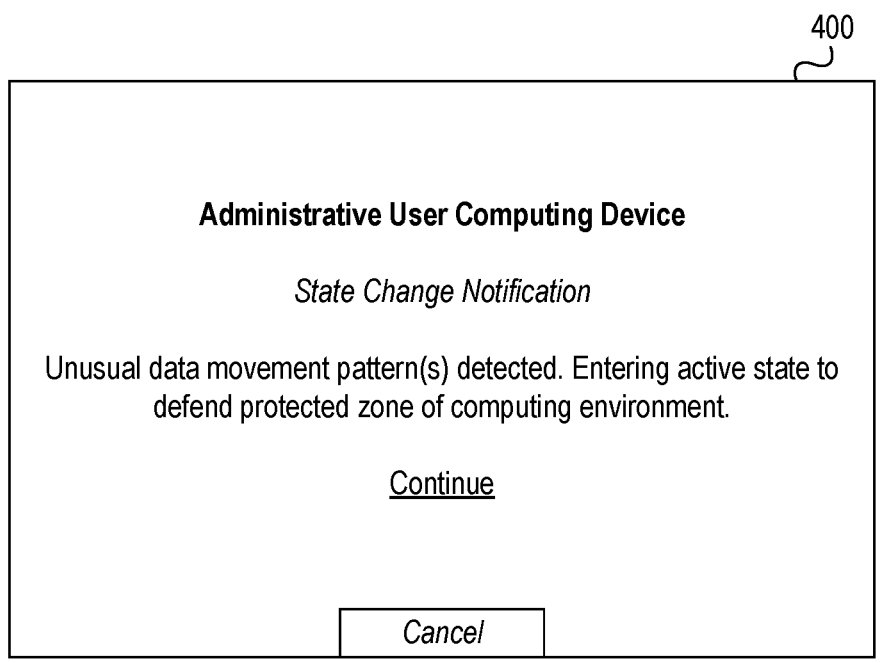

In some embodiments, switching from the passive operational state to the active operational state may include sending a state change notification to a computing device linked to an administrative user of the computing platform. In addition, sending the state change notification to the computing device linked to the administrative user of the computing platform may cause the computing device linked to the administrative user of the computing platform to display the state change notification. For example, in switching from the passive operational state to the active operational state, multi-intercept control computing platform 110 may send a state change notification to a computing device (e.g., user computing device 160) linked to an administrative user of the computing platform (e.g., user computing device 160). In addition, sending the state change notification to the computing device (e.g., user computing device 160) linked to the administrative user of the computing platform (e.g., multi-intercept control computing platform 110) may cause the computing device (e.g., user computing device 160) linked to the administrative user of the computing platform (e.g., multi-intercept control computing platform 110) to display the state change notification. For example, multi-intercept control computing platform 110 may cause user computing device 160 to display and/or otherwise present a graphical user interface similar to graphical user interface 400, which is illustrated in FIG. 4. As seen in FIG. 4, graphical user interface 400 may include text and/or other information notifying the user of user computing device 160 that unusual data movement patterns have been detected and/or that multi-intercept control computing platform 110 is entering an active state to defend the protected zone of computing environment 100.

Figure 2E:
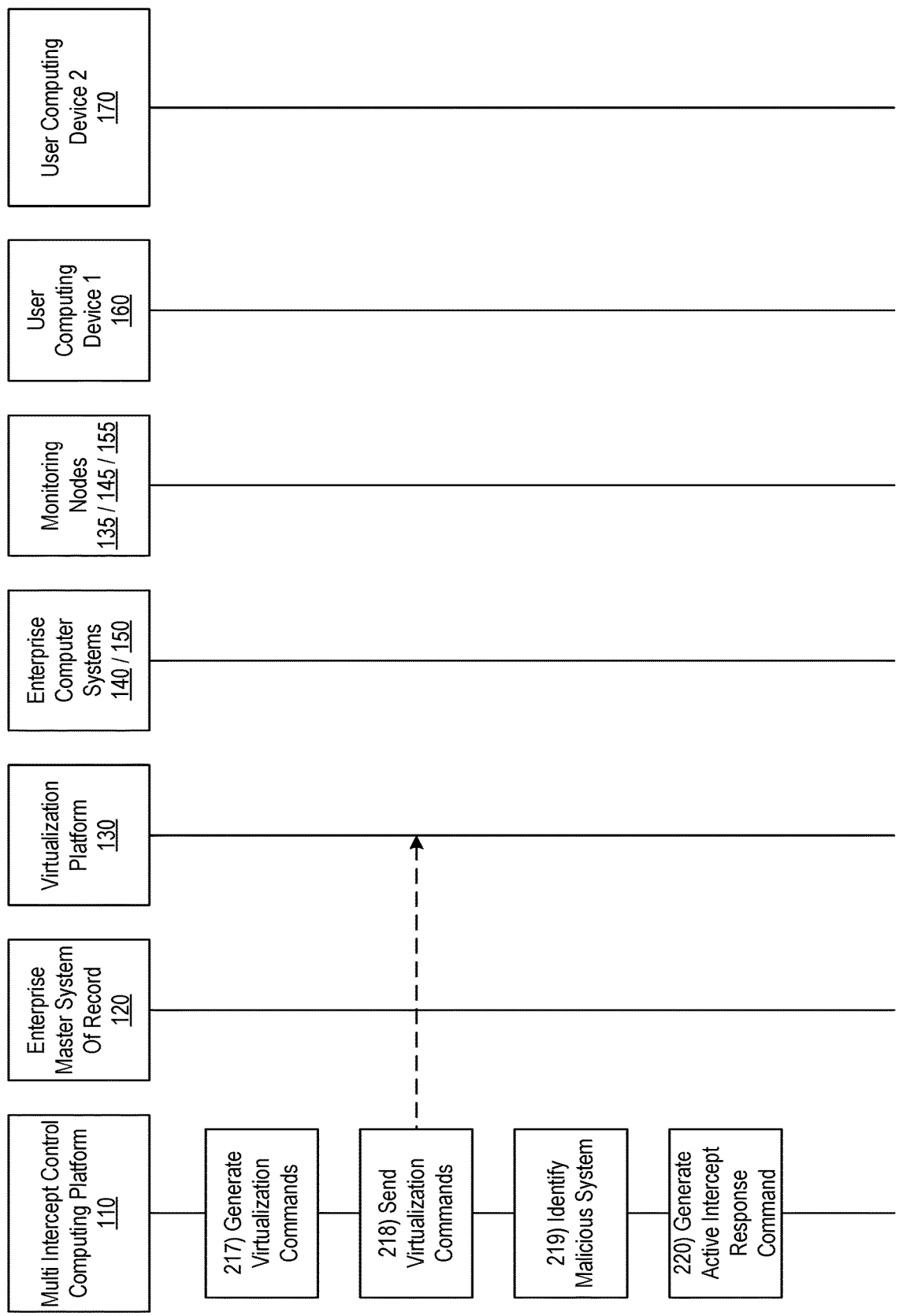

Referring to FIG. 2E, at step 217, multi-intercept control computing platform 110 may generate one or more virtualization commands (e.g., for virtualization platform 130, directing virtualization platform 130 to generate a plurality of dummy virtual machine instances). For example, at step 217, based on switching from the passive operational state to the active operational state, multi-intercept control computing platform 110 may generate one or more virtualization commands directing a virtualization platform (e.g., virtualization platform 130) to generate a plurality of dummy virtual system of record instances. At step 218, multi-intercept control computing platform 110 may send the one or more virtualization commands to virtualization platform 130. For example, at step 218, multi-intercept control computing platform 110 may send, via the communication interface (e.g., communication interface 113), to the virtualization platform (e.g., virtualization platform 130), the one or more virtualization commands directing the virtualization platform (e.g., virtualization platform 130) to generate the plurality of dummy virtual system of record instances.

At step 219, multi-intercept control computing platform 110 may identify a malicious system (which, e.g., in this example event sequence may be user computing device 170). In some instances, the malicious system may be an external malicious system (e.g., operated outside of computing environment 100 and/or used by a user not associated with the enterprise organization operating computing environment 100), while in other instances, the malicious system may be a compromised internal system (e.g., operated inside of computing environment 100 and/or used by a user associated with the enterprise organization operating computing environment 100). Multi-intercept control computing platform 110 may, for instance, identify the malicious system by analyzing the current data movement pattern data to identify a source of the variations in the current data movement pattern data relative to the baseline data movement pattern data.

At step 220, multi-intercept control computing platform 110 may generate an active intercept response command (e.g., to respond to the malicious system which may be attacking one or more elements of computing environment 100). For example, at step 220, based on switching from the passive operational state to the active operational state, multi-intercept control computing platform 110 may generate an active intercept response command. In addition, the active intercept response command may redirect one or more requests from a malicious system into a virtual tunnel configured to route second communications from the malicious system out of the protected zone of the computing environment. For example, the active intercept response command (which may, e.g., be generated by multi-intercept control computing platform 110) may redirect one or more requests from a malicious system (e.g., user computing device 170) into a virtual tunnel configured to route second communications from the malicious system (e.g., user computing device 170) out of the protected zone of the computing environment (e.g., computing environment 100). The virtual tunnel (which may, e.g., be generated and/or managed by multi-intercept control computing platform 110) may, for instance, push user computing device 170 and/or communications from user computing device 170 from a secure system into an unsecure external system with no sensitive data and/or otherwise reroute communications from user computing device 170.

Figure 2F:
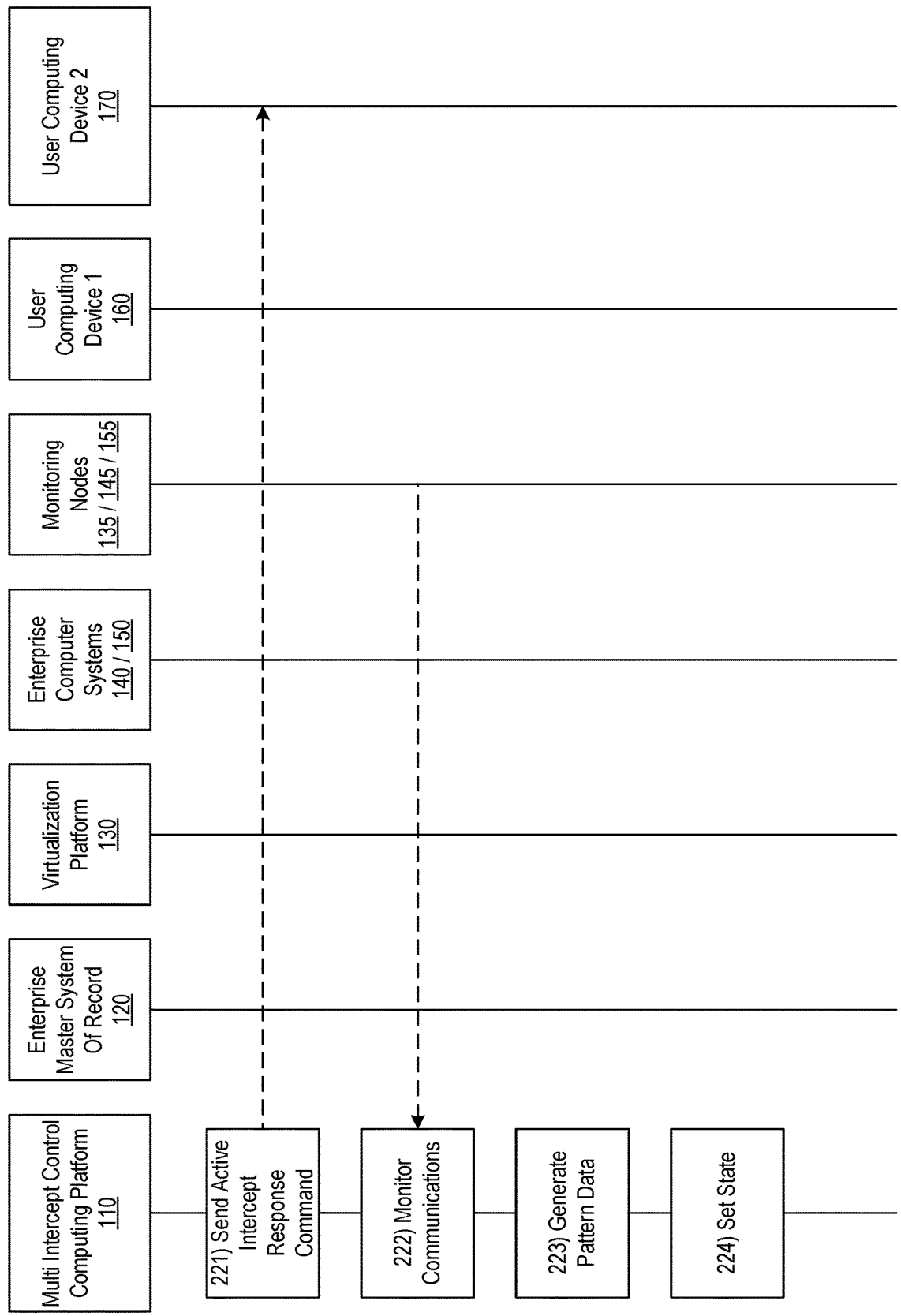

Referring to FIG. 2F, at step 221, multi-intercept control computing platform 110 may send the active intercept response command to the identified malicious system (e.g., user computing device 170). For example, at step 221, multi-intercept control computing platform 110 may send, via the communication interface (e.g., communication interface 113), to the malicious system (e.g., user computing device 170), the active intercept response command redirecting the one or more requests from the malicious system (e.g., user computing device 170) into the virtual tunnel configured to route the second communications from the malicious system (e.g., user computing device 170) out of the protected zone of the computing environment (e.g., computing environment 100).

In some embodiments, the virtual tunnel may be generated by the computing platform and may be configured to route the second communications from the malicious system out of the protected zone of the computing environment to a decoy data generator system. For example, the virtual tunnel may be generated by the computing platform (e.g., multi-intercept control computing platform 110) and may be configured to route the second communications from the malicious system (e.g., user computing device 170) out of the protected zone of the computing environment (e.g., computing environment 100) to a decoy data generator system (which may, e.g., generate and send decoy data and/or other non-usable, non-actual data to user computing device 170).

In some embodiments, the virtual tunnel may be generated by the computing platform and may be configured to route the second communications from the malicious system out of the protected zone of the computing environment to at least one dummy virtual system of record instance of the plurality of dummy virtual system of record instances. For example, the virtual tunnel may be generated by the computing platform (e.g., multi-intercept control computing platform 110) and may be configured to route the second communications from the malicious system (e.g., user computing device 170) out of the protected zone of the computing environment (e.g., computing environment 100) to at least one dummy virtual system of record instance of the plurality of dummy virtual system of record instances (which may, e.g., be generated by virtualization platform 130, as discussed above).

At step 222, multi-intercept control computing platform 110 may monitor communications (e.g., by receiving data from one or more monitoring nodes, intercepting communications between one or more computer systems, and/or the like). For example, at step 222, multi-intercept control computing platform 110 may monitor fifth communications across the plurality of computer systems (e.g., enterprise master system of record 120, virtualization platform 130, enterprise computer system 140, enterprise computer system 150) in the protected zone of the computing environment (e.g., computing environment 100) using the plurality of communication monitoring nodes (e.g., monitoring node 135, monitoring node 145, monitoring node 155) deployed in the protected zone of the computing environment (e.g., computing environment 100).

At step 223, multi-intercept control computing platform 110 may generate current data movement pattern data (e.g., by creating data identifying and/or defining current data movement patterns in computing environment 100 based on the communications monitored by multi-intercept control computing platform 110). For example, at step 223, multi-intercept control computing platform 110 may generate third current data movement pattern data for the protected zone of the computing environment (e.g., computing environment 100) based on monitoring the fifth communications across the plurality of computer systems (e.g., enterprise master system of record 120, virtualization platform 130, enterprise computer system 140, enterprise computer system 150) in the protected zone of the computing environment (e.g., computing environment 100).

At step 224, multi-intercept control computing platform 110 may set an operational state based on the current data movement pattern data. For example, at step 224, multi-intercept control computing platform 110 may set an operational state based on the third current data movement pattern data for the protected zone of the computing environment (e.g., computing environment 100). For instance, multi-intercept control computing platform 110 may remain in the active state if the current data movement pattern data still does not match or is not close enough to the baseline data movement pattern data, as this may indicate that the threat to computing environment 100 posed by the malicious system (e.g., user computing device 170) continues to exist or has otherwise yet to be resolved. Alternatively, multi-intercept control computing platform 110 may switch back to the passive state if the current data movement pattern data does match or is close enough to the baseline data movement pattern data, as this may indicate that the threat to computing environment 100 posed by the malicious system (e.g., user computing device 170) no longer exists or has otherwise been resolved.

Figure 5:
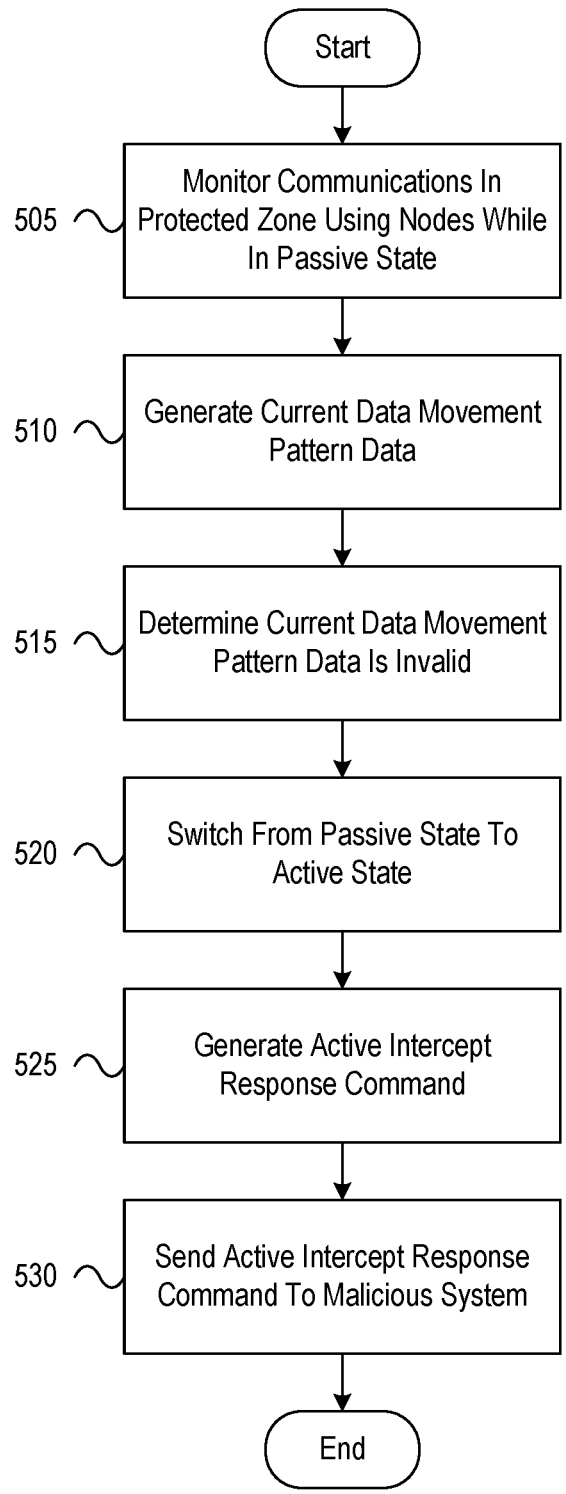
FIG. 5 depicts an illustrative method for preventing unauthorized access to secure enterprise information systems using a multi-intercept system in accordance with one or more example embodiments.

FIG. 5 depicts an illustrative method for preventing unauthorized access to secure enterprise information systems using a multi-intercept system in accordance with one or more example embodiments. Referring to FIG. 5, at step 505, a computing platform having at least one processor, a communication interface communicatively coupled to the at least one processor, and memory storing computer-readable instructions may monitor, in a passive operational state, first communications across a plurality of computer systems in a protected zone of a computing environment using a plurality of communication monitoring nodes deployed in the protected zone of the computing environment. At step 510, the computing platform may generate current data movement pattern data based on monitoring the first communications across the plurality of computer systems in the protected zone of the computing environment. At step 515, the computing platform may determine that the current data movement pattern data is invalid based on comparing the current data movement pattern data to baseline data movement pattern data for the protected zone of the computing environment. At step 520, in response to determining that the current data movement pattern data is invalid based on comparing the current data movement pattern data to the baseline data movement pattern data, the computing platform may switch from the passive operational state to an active operational state. At step 525, based on switching from the passive operational state to the active operational state, the computing platform may generate an active intercept response command, and the active intercept response command may redirect one or more requests from a malicious system into a virtual tunnel configured to route second communications from the malicious system out of the protected zone of the computing environment. At step 530, the computing platform may send, via the communication interface, to the malicious system, the active intercept response command redirecting the one or more requests from the malicious system into the virtual tunnel configured to route the second communications from the malicious system out of the protected zone of the computing environment.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   monitor, in a passive operational state, first communications across a plurality of computer systems in a protected zone of a computing environment using a plurality of communication monitoring nodes deployed in the protected zone of the computing environment;
   generate current data movement pattern data based on monitoring the first communications across the plurality of computer systems in the protected zone of the computing environment;
   determine that the current data movement pattern data is invalid based on comparing the current data movement pattern data to baseline data movement pattern data for the protected zone of the computing environment;
   in response to determining that the current data movement pattern data is invalid based on comparing the current data movement pattern data to the baseline data movement pattern data, switch from the passive operational state to an active operational state;
   based on switching from the passive operational state to the active operational state, generate an active intercept response command, the active intercept response command redirecting one or more requests from a malicious system into a virtual tunnel configured to route second communications from the malicious system out of the protected zone of the computing environment; and
   send, via the communication interface, to the malicious system, the active intercept response command redirecting the one or more requests from the malicious system into the virtual tunnel configured to route the second communications from the malicious system out of the protected zone of the computing environment.

2. The computing platform of claim 1, wherein monitoring the first communications across the plurality of computer systems in the protected zone of the computing environment using the plurality of communication monitoring nodes deployed in the protected zone of the computing environment comprises receiving, from the plurality of communication monitoring nodes deployed in the protected zone of the computing environment, one or more data transmissions intercepted by the plurality of communication monitoring nodes deployed in the protected zone of the computing environment.

3. The computing platform of claim 1, wherein monitoring the first communications across the plurality of computer systems in the protected zone of the computing environment using the plurality of communication monitoring nodes deployed in the protected zone of the computing environment comprises intercepting at least one data transmission associated with a computer system that is not linked to a communication monitoring node of the plurality of communication monitoring nodes.

4. The computing platform of claim 1, wherein determining that the current data movement pattern data is invalid based on comparing the current data movement pattern data to the baseline data movement pattern data for the protected zone of the computing environment comprises loading the baseline data movement pattern data for the protected zone of the computing environment from an environment profile associated with the computing environment maintained by the computing platform.

5. The computing platform of claim 1, wherein switching from the passive operational state to the active operational state comprises sending a state change notification to a computing device linked to an administrative user of the computing platform, wherein sending the state change notification to the computing device linked to the administrative user of the computing platform causes the computing device linked to the administrative user of the computing platform to display the state change notification.

6. The computing platform of claim 1, wherein the virtual tunnel is generated by the computing platform and is configured to route the second communications from the malicious system out of the protected zone of the computing environment to a decoy data generator system.

7. The computing platform of claim 1, wherein the memory stores additional computer-readable instructions that, when executed by the at least one processor, cause the computing platform to:
   based on switching from the passive operational state to the active operational state, generate one or more virtualization commands directing a virtualization platform to generate a plurality of dummy virtual system of record instances; and
   send, via the communication interface, to the virtualization platform, the one or more virtualization commands directing the virtualization platform to generate the plurality of dummy virtual system of record instances.

8. The computing platform of claim 7, wherein the virtual tunnel is generated by the computing platform and is configured to route the second communications from the malicious system out of the protected zone of the computing environment to at least one dummy virtual system of record instance of the plurality of dummy virtual system of record instances.

9. The computing platform of claim 1, wherein the memory stores additional computer-readable instructions that, when executed by the at least one processor, cause the computing platform to:

prior to monitoring the first communications across the plurality of computer systems in the protected zone of the computing environment:
scan the computing environment to identify the plurality of computer systems in the protected zone of the computing environment and to register the plurality of communication monitoring nodes deployed in the protected zone of the computing environment.

10. The computing platform of claim 9, wherein the memory stores additional computer-readable instructions that, when executed by the at least one processor, cause the computing platform to:
after scanning the computing environment:
monitor third communications across the plurality of computer systems in the protected zone of the computing environment using the plurality of communication monitoring nodes deployed in the protected zone of the computing environment;
generate baseline data movement pattern data for the protected zone of the computing environment based on monitoring the third communications across the plurality of computer systems in the protected zone of the computing environment; and
store the baseline data movement pattern data for the protected zone of the computing environment in an environment profile associated with the computing environment.

11. The computing platform of claim 10, wherein the memory stores additional computer-readable instructions that, when executed by the at least one processor, cause the computing platform to:
after storing the baseline data movement pattern data for the protected zone of the computing environment in the environment profile associated with the computing environment:
validate the baseline data movement pattern data for the protected zone of the computing environment stored in the environment profile associated with the computing environment.

12. The computing platform of claim 11, wherein validating the baseline data movement pattern data for the protected zone of the computing environment stored in the environment profile associated with the computing environment comprises sending a validation prompt to a computing device linked to an administrative user of the computing platform, wherein sending the validation prompt to the computing device linked to the administrative user of the computing platform causes the computing device linked to the administrative user of the computing platform to display the validation prompt.

13. The computing platform of claim 10, wherein the memory stores additional computer-readable instructions that, when executed by the at least one processor, cause the computing platform to:
monitor fourth communications across the plurality of computer systems in the protected zone of the computing environment using the plurality of communication monitoring nodes deployed in the protected zone of the computing environment;
generate second current data movement pattern data for the protected zone of the computing environment based on monitoring the fourth communications across the plurality of computer systems in the protected zone of the computing environment;
determine that the second current data movement pattern data is valid based on comparing the second current data movement pattern data to the baseline data movement pattern data for the protected zone of the computing environment; and
in response to determining that the second current data movement pattern data is valid based on comparing the second current data movement pattern data to the baseline data movement pattern data, remain in the passive operational state.

14. The computing platform of claim 13, wherein the memory stores additional computer-readable instructions that, when executed by the at least one processor, cause the computing platform to:
monitor fifth communications across the plurality of computer systems in the protected zone of the computing environment using the plurality of communication monitoring nodes deployed in the protected zone of the computing environment;
generate third current data movement pattern data for the protected zone of the computing environment based on monitoring the fifth communications across the plurality of computer systems in the protected zone of the computing environment; and
set an operational state based on the third current data movement pattern data for the protected zone of the computing environment.

15. A method, comprising:
at a computing platform comprising at least one processor, memory, and a communication interface:
monitoring, by the at least one processor, in a passive operational state, first communications across a plurality of computer systems in a protected zone of a computing environment using a plurality of communication monitoring nodes deployed in the protected zone of the computing environment;
generating, by the at least one processor, current data movement pattern data based on monitoring the first communications across the plurality of computer systems in the protected zone of the computing environment;
determining, by the at least one processor, that the current data movement pattern data is invalid based on comparing the current data movement pattern data to baseline data movement pattern data for the protected zone of the computing environment;
in response to determining that the current data movement pattern data is invalid based on comparing the current data movement pattern data to the baseline data movement pattern data, switching, by the at least one processor, from the passive operational state to an active operational state;
based on switching from the passive operational state to the active operational state, generating, by the at least one processor, an active intercept response command, the active intercept response command redirecting one or more requests from a malicious system into a virtual tunnel configured to route second communications from the malicious system out of the protected zone of the computing environment; and
sending, by the at least one processor, via the communication interface, to the malicious system, the active intercept response command redirecting the one or more requests from the malicious system into the virtual tunnel configured to route the second communications from the malicious system out of the protected zone of the computing environment.

16. The method of claim 15, wherein monitoring the first communications across the plurality of computer systems in the protected zone of the computing environment using the plurality of communication monitoring nodes deployed in the protected zone of the computing environment comprises receiving, from the plurality of communication monitoring nodes deployed in the protected zone of the computing environment, one or more data transmissions intercepted by the plurality of communication monitoring nodes deployed in the protected zone of the computing environment.

17. The method of claim 15, wherein monitoring the first communications across the plurality of computer systems in the protected zone of the computing environment using the plurality of communication monitoring nodes deployed in the protected zone of the computing environment comprises intercepting at least one data transmission associated with a computer system that is not linked to a communication monitoring node of the plurality of communication monitoring nodes.

18. The method of claim 15, wherein determining that the current data movement pattern data is invalid based on comparing the current data movement pattern data to the baseline data movement pattern data for the protected zone of the computing environment comprises loading the baseline data movement pattern data for the protected zone of the computing environment from an environment profile associated with the computing environment maintained by the computing platform.

19. The method of claim 15, wherein switching from the passive operational state to the active operational state comprises sending a state change notification to a computing device linked to an administrative user of the computing platform, wherein sending the state change notification to the computing device linked to the administrative user of the computing platform causes the computing device linked to the administrative user of the computing platform to display the state change notification.

20. One or more non-transitory computer-readable media storing instructions that, when executed by a computing platform comprising at least one processor, memory, and a communication interface, cause the computing platform to:
monitor, in a passive operational state, first communications across a plurality of computer systems in a protected zone of a computing environment using a plurality of communication monitoring nodes deployed in the protected zone of the computing environment;
generate current data movement pattern data based on monitoring the first communications across the plurality of computer systems in the protected zone of the computing environment;
determine that the current data movement pattern data is invalid based on comparing the current data movement pattern data to baseline data movement pattern data for the protected zone of the computing environment;
in response to determining that the current data movement pattern data is invalid based on comparing the current data movement pattern data to the baseline data movement pattern data, switch from the passive operational state to an active operational state;
based on switching from the passive operational state to the active operational state, generate an active intercept response command, the active intercept response command redirecting one or more requests from a malicious system into a virtual tunnel configured to route second communications from the malicious system out of the protected zone of the computing environment; and
send, via the communication interface, to the malicious system, the active intercept response command redirecting the one or more requests from the malicious system into the virtual tunnel configured to route the second communications from the malicious system out of the protected zone of the computing environment.

\* \* \* \* \*